United States Patent
Conger et al.

(10) Patent No.: US 12,450,422 B2
(45) Date of Patent: Oct. 21, 2025

(54) INTELLIGENT CAPTURING OF USER-VIEWED CONTENT FOR NOTE KEEPING

(71) Applicant: Microsoft Technology Licensing, LLC

(72) Inventors: David J. Conger, Issaquah, WA (US); Iman Abdullahi Yusuf, Kent, WA (US); Fnu Primadona, Mill Creek, WA (US); Eric Anderson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/446,812

(22) Filed: Aug. 9, 2023

(65) Prior Publication Data
US 2025/0053728 A1 Feb. 13, 2025

(51) Int. Cl.
*G06F 3/048* (2013.01)
*G06F 40/169* (2020.01)
*G06V 30/10* (2022.01)

(52) U.S. Cl.
CPC ........... *G06F 40/169* (2020.01); *G06V 30/10* (2022.01)

(58) Field of Classification Search
CPC ........ G06F 40/169; G06F 3/048; G06V 30/10
See application file for complete search history.

(56) References Cited

U.S. PATENT DOCUMENTS

| | | | |
|---|---|---|---|
| 2012/0004905 A1* | 1/2012 | Bobick | G06F 16/951 704/9 |
| 2014/0019562 A1* | 1/2014 | Le Chevalier | G06Q 50/01 715/230 |
| 2014/0278405 A1* | 9/2014 | Peters | G10L 15/1822 704/235 |
| 2019/0325084 A1* | 10/2019 | Peng | G10L 15/02 |
| 2020/0210521 A1* | 7/2020 | Hutchins | G06F 40/35 |
| 2021/0256681 A1 | 8/2021 | Segal | |
| 2024/0256582 A1* | 8/2024 | Jain | G06F 16/3329 |
| 2024/0311652 A1* | 9/2024 | Kulkarni | G06N 3/045 |
| 2024/0419919 A1* | 12/2024 | Xiang | G06F 40/56 |

OTHER PUBLICATIONS

International Search Report and Written Opinion received for PCT Application No. PCT/US2024/038434, Oct. 1, 2024, 13 pages.

* cited by examiner

*Primary Examiner* — Mahelet Shiberou
(74) *Attorney, Agent, or Firm* — NovoTechIP International PLLC

(57) ABSTRACT

A device for generating archival notes for a user based on content a user has located electronically and viewed on a display device includes: a display for presenting information to a user, a user interface for receiving user input from the user; a processor; and a memory storing executable instructions which, when executed by the processor, cause the processor, alone or in combination with other processors, to perform the following: capturing information on the display; operating a prompt generator to structure a prompt for a generative Artificial Intelligence (AI) model, the prompt based on the information captured from the display and causing the AI model to generate a note based on the information captured; and storing the note in a user data structure for future reference by the user.

13 Claims, 8 Drawing Sheets

INTELLIGENT CAPTURING OF USER-VIEWED CONTENT FOR NOTE KEEPING

BACKGROUND

Modern devices put an incredible wealth of information at a user's fingertips. Whether on a computer, mobile phone or other device with network connectivity, users can search for and read information on any imaginable topic. Users can also store and organize information they want to track, for example, by saving files to a file system or within an application. The information managed through a device is limitless and can be general information or information that is specific to a particular user, such as a calendar of the user's appointments.

As users search for and read through information, they may see information on-screen that they want to capture and store for later reference. When users find information that they want to capture, there are many choices to make. These choices include what tools to use and how the information should be captured so that it can be found and be useful later. These decisions can be made at the time of capture or the format and storage of the information may be refined later when coming back to the information. In either case, the process consumes user attention and time.

For example, suppose a user finds useful information on a website or via a link that needs to be captured for later reference. The user can choose to simply capture the Uniform Resource Locator (URL) or link of the information, perhaps by bookmarking. However, such links with minimal additional information (perhaps just a title) may not be helpful to the user when trying to find that information again in the future. The user will likely have to go to the URL or link and re-read and mentally reprocess the content to reengage with the specific information desired. This necessarily takes time away from other tasks.

Alternatively, a user can copy all the content they have located that they want to remember. For example, the information can be stored as a file or as a note in a notebook application. In some cases, this could result in a very large note. The user may then need to spend time formatting, paring down or annotating the collected information to make it more accessible in the future. This may provide for more effective recall than simply having the link from which the information came, but still requires mental processing both as the data is captured and possibly when the user reviews it again later.

As another alternative, a user can use a screen capture function. This method may provide for a quick capture of the specific information wanted. However, it will not have the advantages of information specifically annotated or curated by the user. When coming back to the screen capture, the user may still need to re-process the information and try to recall what they thought was important.

Alternatively, users can spend significant time creating notes of information they want to retain. For example, the user might read an article and then determine the key points to extract, or look at a listing to choose the specific properties of an item that are important. The user then records these key points into an appropriate format. This requires a mental synthesis to determine, extract, and compose the information. Compounded across capturing information in many instances, this approach costs a user significant time processing information.

SUMMARY

In one general aspect, the instant disclosure presents a device for generating archival notes for a user based on content a user has located electronically and viewed on a display device includes: a display for presenting information to a user, a user interface for receiving user input from the user; a processor; and a memory storing executable instructions which, when executed by the processor, cause the processor, alone or in combination with other processors, to perform the following: capturing information on the display; operating a prompt generator to structure a prompt for a generative Artificial Intelligence (AI) model, the prompt based on the information captured from the display and causing the AI model to generate a note based on the information captured; and storing the note in a user data structure for future reference by the user.

A method of generating archival notes for a user based on content a user has located electronically and viewed on a display device is described. The method includes: capturing information on the display device; operating a prompt generator to structure a prompt for a generative Artificial Intelligence (AI) model, the prompt based on the information captured from the display device and causing the AI model to generate a note based on the information captured; and storing the note in a user data structure for future reference by the user.

A non-transitory computer-readable medium storing a capture application includes instructions which, when executed by the processor, cause the processor, alone or in combination with other processors, to perform the following to generate archival notes for a user based on content a user has located electronically and viewed on a display device: capture information on the display device; operate a prompt generator to structure a prompt for a generative Artificial Intelligence (AI) model, the prompt based on the information captured from the display device and causing the AI model to generate a note based on the information captured; and store the note in a user data structure for future reference by the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

As noted above, with access to unlimited information, users may struggle to efficiently capture and store particularly useful information that they will want to refer to again in the future. While the storage of information is not an issue generally, organizing the format, content and accessibility of a personal information collection can be time consuming and burdensome.

The following description recognizes that Artificial Intelligence (AI), for example Large Language Models (LLMs), present tools to help solve these technical data management problems described above. LLMs, such as Generative Pre-Training Transformers (GPT), are sophisticated AI systems that can receive, for example, a text input and return a response, summary, revision or extension to that input. In many applications, the GPT is asked to answer questions in the input in a form that may appear as if written by a human being. As described below, the data that a user has located using a device and that is displayed on the device screen can serve as the input for an AI model that is able to help the user capture the importance of the content that has been located and provide an output that will allow the user to much more effectively store the important information for later reference.

Figure 1:
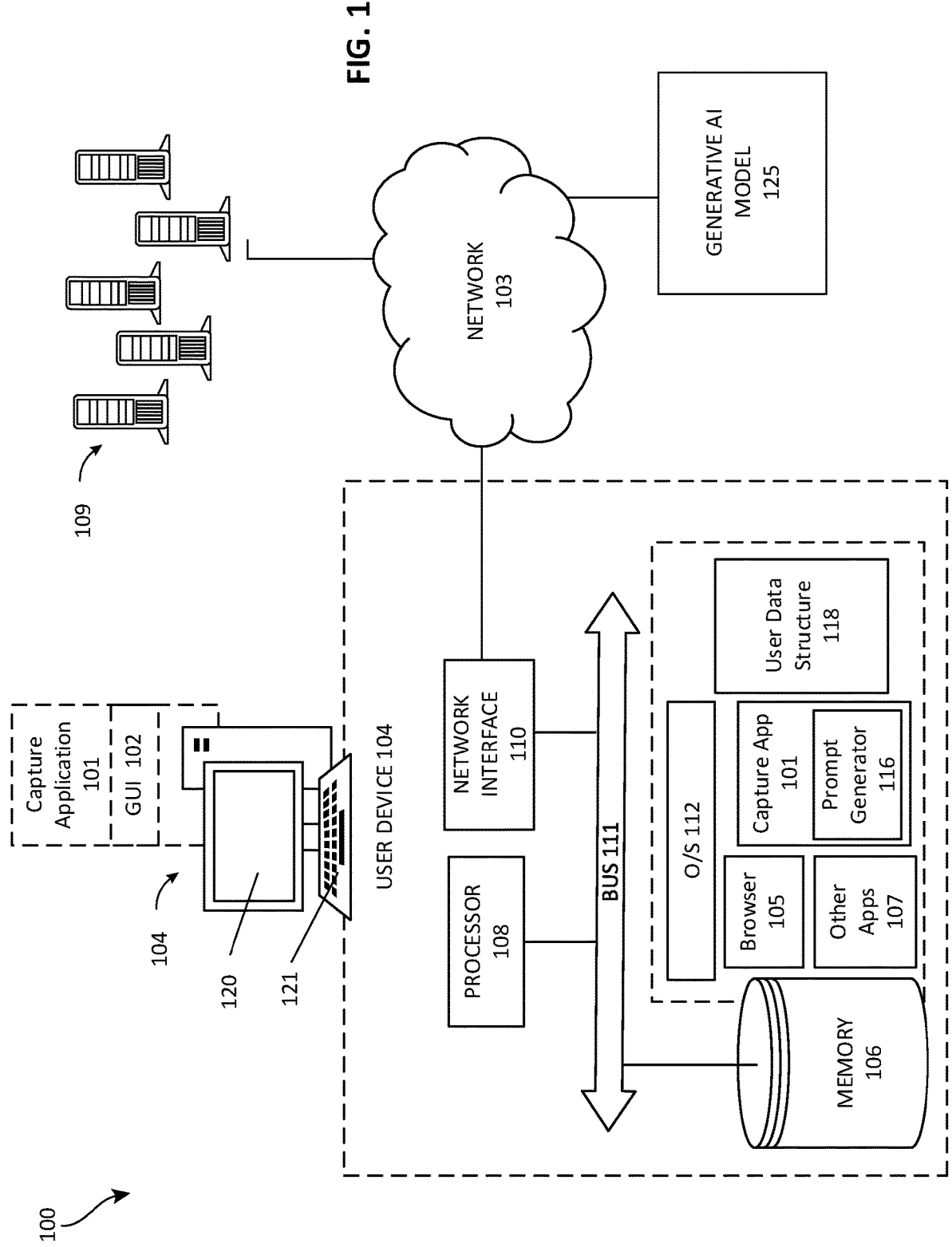
FIGS. 1 and 2 depict examples of a system in which aspects of this disclosure may be implemented.
Figure 2:
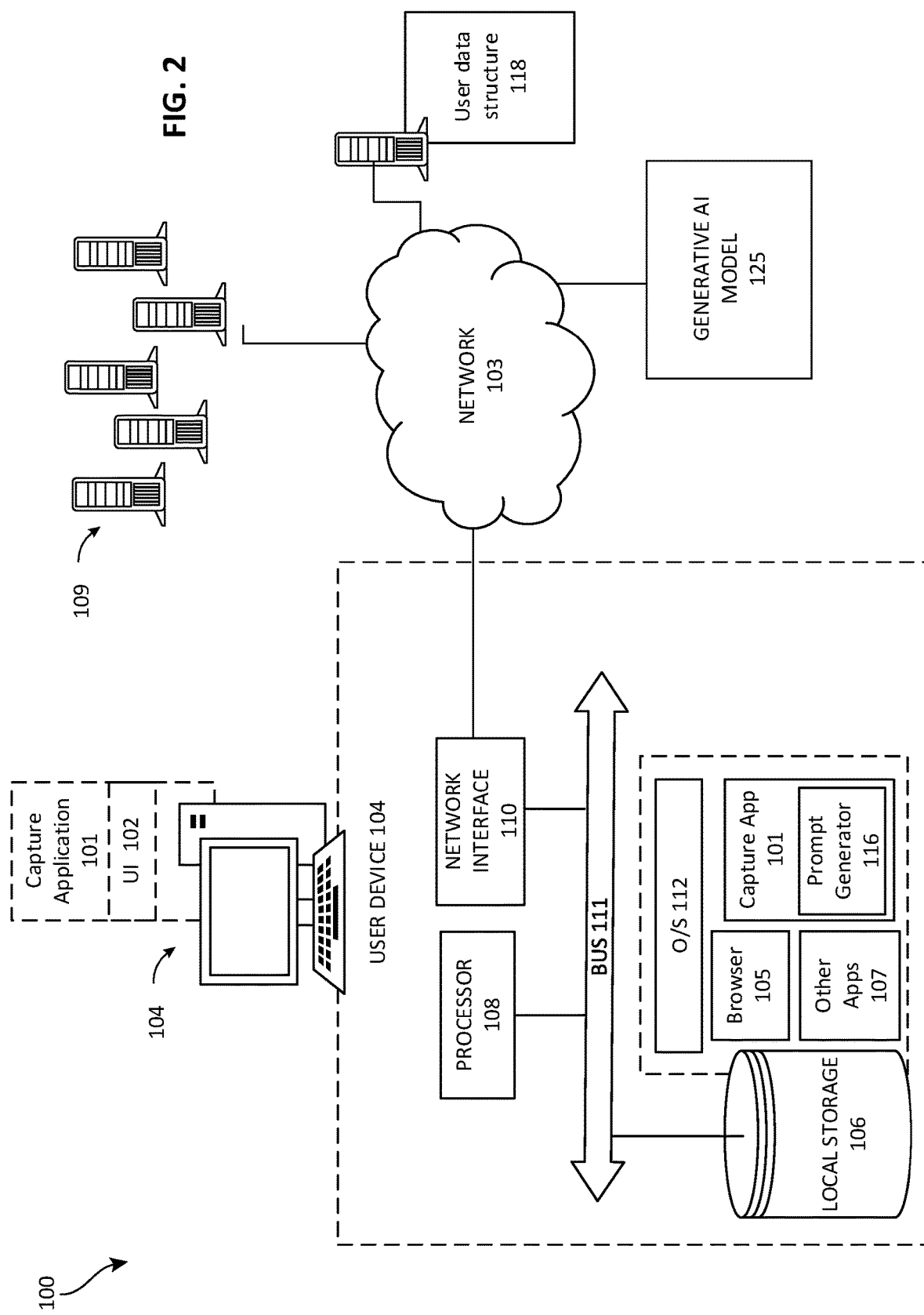

FIGS. 1 and 2 depict examples of a system 100 in which aspects of this disclosure may be implemented. In the scenario depicted in FIG. 1, a user is operating a user device 104. The user device may be any user device, for example, a desktop computer, laptop computer, tablet computer, smartphone, personal digital assistant or other user device. The user device 104 includes a screen 120 on which information is displayed for the user. The user device 104 also includes a number of user input devices 121. The user input devices 121 may include, but are not limited to, a keyboard, mouse, trackpad, stylus, other pointing device, graphical user interface (GUI), touchscreen, etc.

The user device 104 may include internally a processor 108 and memory 106. A network interface 110 provides communication for the user device 104 with a network 103. The connection to the network 103 may be wired or wireless. The network can be any data network including, for example, a Local Area Network, Wide Area Network, the Internet or other data network. A data bus provides communication between the processor 108, memory 106 and network interface 110. Additional details of the components of an example of a user device are depicted in and explained with reference to FIG. 8.

The memory 106 stores the firmware and software of the user device 104 for execution by the processor 108. This will include an operating system O/S 112 that provides a platform on which other applications can operate. For example, a browser application 105 allows the user to browse information and websites from any of the various sites/servers 109 available via the network 103. Other applications 107 may include, for example, an email application, with which a user receives information via the network 103.

The memory 106 can also store a user data structure 118 in which the user stores data. This user data structure 118 may include a file system with files for any number of productivity or other applications, a gallery of photographs and videos, other media files, a user database, a data archive, etc. The user data structure 118 is where the user stores information that the user wants to retain for future use or reference. There is no limitation on the form or format in which data or information is recorded in the user data structure 118. In some examples, the user data structure could be a database assembled by the user through a notebook or other specific application, such as OneNote by MicroSoft®.

As noted above, recording information in the data structure 118 in a manner that allows the user to efficiently find, recall and re-engage with desired information can present a number of technical problems. Substantial user time and effort can be expended in trying to resolve these data archival and retrieval issues with limited success.

In an example scenario, the user may be operating the user device 104 to review information available from servers 109 over the network (103). The information served to the user can include text, images, audio, video and any other format. The information is presented to the user via the screen 120 and other output devices of the user device 104. Frequently, the user may be viewing information on the screen 120 that the user would like to retain for future reference. This may include reorganizing the data into a form that better suits the specific needs of the user. As described above, there have been a number of ways the user might manually capture and record such information. All of these efforts have required the time and attention of the user in an attempt to make the information of interest readily available for recall and quickly intelligible in the future. Many users may be discouraged from putting in the time and effort required to effectively archive important information and may, instead, simply reinitiate the entire search for the information when it is next needed. Additionally, if a user does take the time to archive important data for later recall, when the user returns to the stored information, it may be difficult find where in the user's persona data archive the information was stored or to determine why or what portion of the information was considered relevant. These technical problems may effectively bar the user from making any effective use of information previously identified and archived.

To solve these technical problems, the example of FIG. 1 includes a capture application 101 that is implemented on the user device 104. This capture application 101 may be integrated into the operating system 112. Alternatively, the capture application 101 may be integrated into another application 107 such as, for example, a browser 105, an email application, a notebook application or any other application. Lastly, the capture application 101 may be a stand-alone application or a web service (e.g., Software as a Service). In any of these or other cases, the capture application 101 will include a GUI 102 or other user interface that allows the user to invoke the features of the capture application 101 as described herein.

When invoked, the features of the capture application 101 will assist the user in capturing useful information that the user has received via the user device 104. Specifically, the capture application 101 will solve the technical problems previously faced by the user in organizing or reorganizing the information and effectively archiving the information in the user data structure 118.

As will be described in greater detail below, the capture application 101, when invoked, will capture information displayed on the screen 120. This capture can include any of screenshots, Optical Character Recognition, metadata parsing and noting the spatial relationships between different content elements such as text, images, audio and video elements. All this and other information captured by the capture application 101 from the information displayed on the screen 120 is provided to a prompt generator 116 of the capture application 101. The prompt generator 116 structures this captured information into a prompt for a generative AI model 125. The AI model 125 may be, for example, a Generative Pre-Training Transformers (GPT) such as GPT 3 or 4, ChatGPT or other LLM. The prompt may specify to the AI model to exclusive advertising, navigation, and other extraneous information on the display so it is ignored in favor of the action content the user has identified.

In a basic example, the prompt generator may structure the captured information for ingestion by the AI model 125 and include an instruction that the AI model 125 summarize the captured information, for example, as a series of bullet points. The user device 104 transmits the prompt from the prompt generator 116 of the capture application to the generative AI model 125. The AI model 125 responds to the prompt by returning a note containing a summary or other revision of the captured information.

This note can be much more useful to the user than the original form of the captured information. When the user accesses the note later, the user may not immediately remember why the information was important. If all the captured information is stored and retrieved, the user will have to wade through all the information previously displayed to recall the significance of the information. In contrast, the note provided by the generative AI model 125 focuses the information and can help the user much more quickly recall the significance of the information. The note can be added to the user data structure 118 for subsequent use. All of the captured information may also be stored in the user data structure 118 in case the user needs details that were omitted by the AI model 125 from the note.

In another example, the prompt is an instruction to extract a certain type of information from the captured information. The prompt could be an instruction to both extract a certain type of information and to then summarize or provide a particular organization, such as alphabetical or temporal, to the extracted information. Any such instruction, depending on the needs and intent of the user, can be included in the prompt. In some examples, the prompt may be formatted in natural language.

In various examples described in more detail below, the capture application 101 may present any output from the AI model 125 for the user to review and approve. If the user is not satisfied, the AI model 125 can be asked to re-generate the note. This may include updating the prompt with the prompt generator 116. The user interface 102 of the capture application 101 can also allow the user to input instructions or a cue for what type of information is important and should be emphasized in the note output by the AI model 125. The prompt generator 116 will include any such user instructions, likely in natural language form, in the prompt to the AI model 125.

The user can also provide input through the GUI 102 as to where or how the output of the AI model 125 is to be stored in the user data structure 118. For example, the user may specify that information captured during a present session is to be stored in a particular folder of a file system or in a particular section of a notebook file created with a notebook application. Any instruction can be given by the user through the GUI 102 as to how and where to store captured information. The capture application 101 will then store the information as specified. This will include, primarily, the output of the AI model based on information captured from the screen 120, but may also include some or all of the raw data captured from the screen 120 as well.

FIG. 2 illustrates another example of the system 100 described above with respect to FIG. 1. Similar or the same elements are marked with the same reference number. As shown in FIG. 2, the user data structure 118 can be a cloud resource. Specifically, the user data structure 118 may be stored on a remote server that is accessible to the user device 104 via the network 103. Except for location, the user data structure 118 of FIG. 2 performs the same function as the structure 118 described above with respect to FIG. 1. Some users may prefer to store some or all of the user data structure 118 in the cloud for enhanced security, accessibility and reliability. In other examples, parts of the user data structure 118 may be stored locally on the user device 104 while other portions are in the cloud. Parts of the user data structure 118 may be stored both locally on the user device 104 and mirrored to the cloud.

Figure 3:
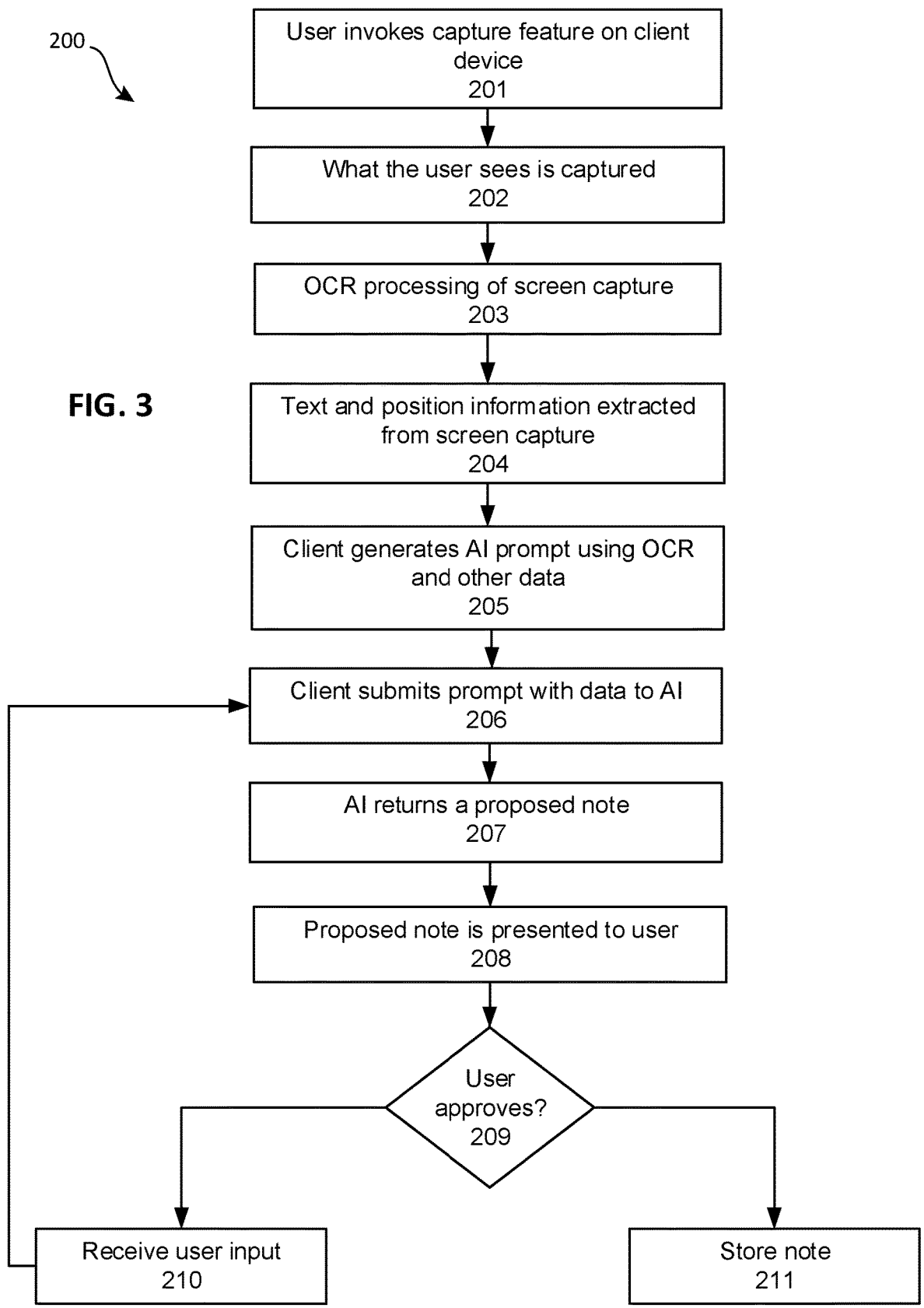
FIG. 3 is a flowchart depicting a method of capturing information for a user according to principles described herein.

FIG. 3 is a flowchart depicting a method 200 of capturing information for a user according to principles described herein. As shown in FIG. 3 and consistent with the description above, the method begins when the user invokes 201 the capture feature of the capture application on the client or user device. Next, as described above, what the user sees in the user interface of the device is captured 202. This may include OCR processing 203 of a screen capture to enable extraction of the text that the user has viewed. The text and position information for content elements is then extracted 204 from the screen capture. Advertising or other extraneous content can be filtered and ignored. Alternatively to OCR from a screen capture, the system may collect content by other means such as cross-process API or by the note capture running within another applications extensibility model, providing it direct access to the content. For example, if the note capture system is run from within a browser extension, it could have full access to the HTML of the page and use that data without having to run OCR. In another example, the system might be able to do cross-process call (from one app to another) to request the information shown to the user without needing an OCR.

The client or user device then prepares a prompt for the AI model 205. This may be performed by the prompt generator of FIG. 1. As described above, this may include the text determined by OCR and other data, such as the positional relationships of content elements in the screen capture, metadata from the site accessed, user instructions on how to structure the output, etc. The client device then submits 206 the prompt to the AI model. The AI model returns 207 a proposed note to be added to the user's data structure. The note will better represent the data of interest to the user than the raw data from the screen capture. The proposed note could be automatically added to the user data structure. However, in other examples, the note may be presented 208 to the user for review. The user may approve 209 or disapprove of the note.

If the user approves 209 of the note, the note is stored 211 as part of the user data structure. As noted above, the capture application may have instructions from the user as to how and where, e.g., format and location, that the note is to be stored in the user data structure. Alternatively, if the user disapproves 209 of the note, the note can be regenerated by sending 206 another prompt to the AI model. The AI model can be prompted to try again using the same prompt as the original attempt. Given the nature of a generative AI model, the resulting note will be somewhat different than the previous note and may better suit the user. Alternatively, the capture application may receive 210 user input that further specifies how the captured information is to be filtered or organized by the AI model. Any such instruction is added to a new prompt to be submitted 206 to the AI model. The method can continue to loop with additional prompts to the AI model until the user is satisfied or terminates the process.

Figure 4:
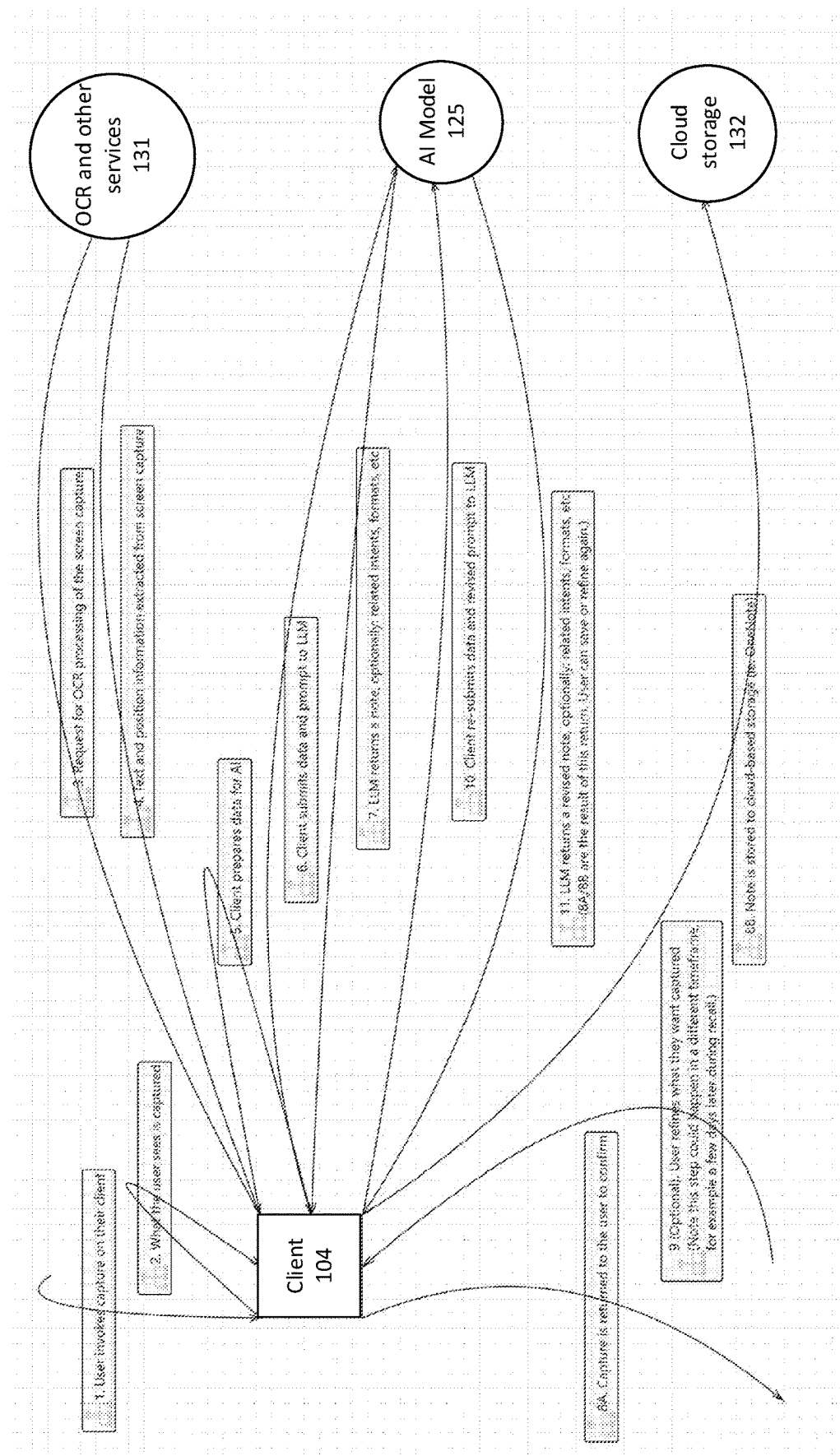
FIG. 4 is a chart depicting a process flow for capturing information for a user according to principles described herein.

FIG. 4 is another chart depicting a process flow for capturing information for a user consistent with FIG. 3 and according to principles described herein. As shown in FIG. 4, the user invokes the capture feature on the user device 104. As described above, what the user sees is captured. An OCR or other service 131 may be called to process the captured content, including text and position information being extracted from the screen capture. This data is returned to the user device 104. The client device then prepares and submits a prompt for an AI model 125, as described above.

The AI model 125 returns a note based on the content that captured what the user was viewing. The note may be presented to the user to confirm that the note meets the user's needs. If not, the user can refine a cue as to what information should be captured. This can happen during the original capture process or at a later time than the user reviewing the note. If the user is satisfied, the note is retained in the user data structure. This may be in cloud storage 132, as described above. Alternatively, if the user is not satisfied, an updated prompt to the AI model 125 can be prepared. The AI model 125 then returns a revised note based on the new prompt.

Figure 5:
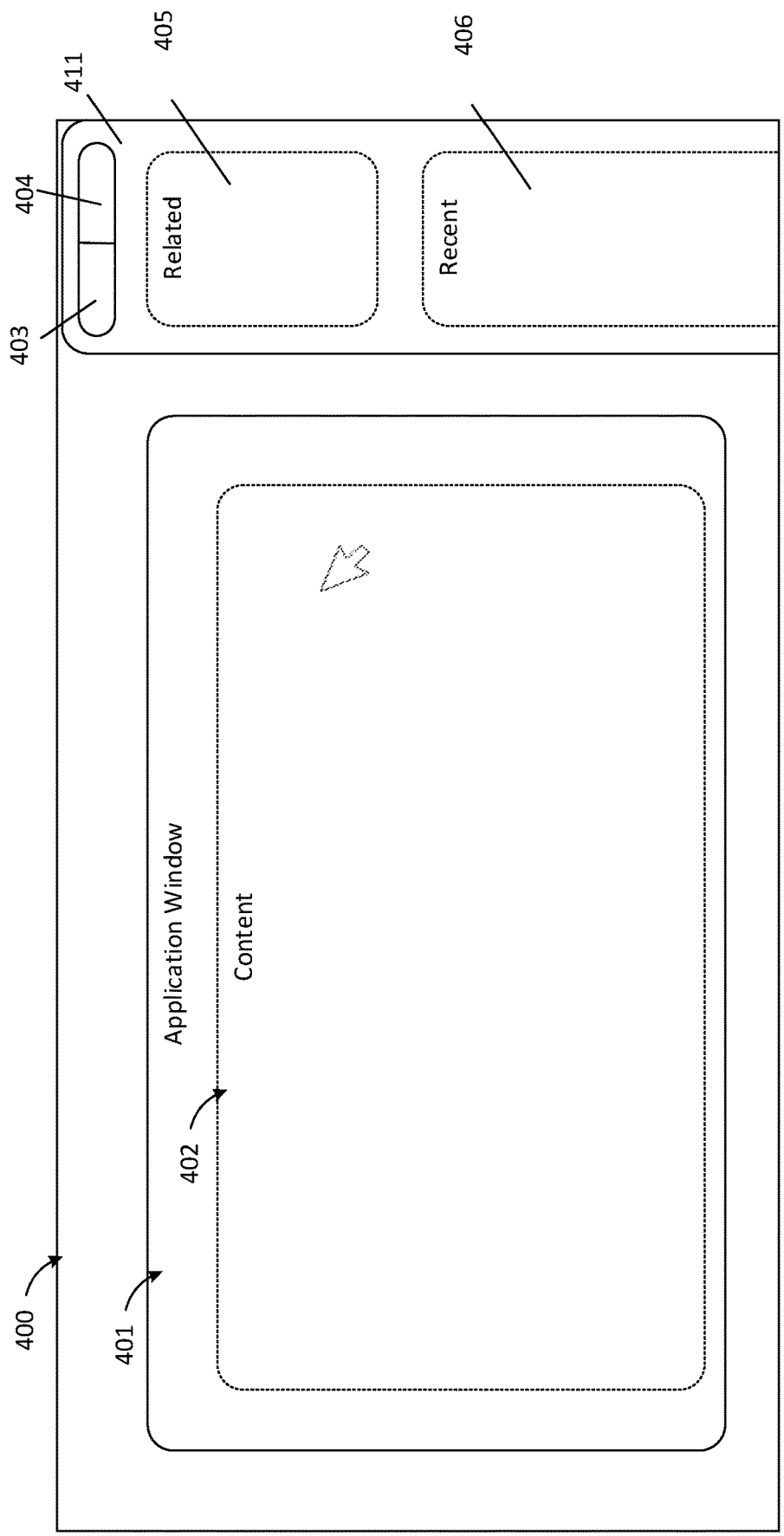
FIG. 5 depicts an example of a user interface according to principles described herein.

FIG. 5 depicts an example of a user interface according to principles described herein. As shown in FIG. 5, a user interface 400 of the capture application can include the following. An application window 401 allows an application to display content 402. As explained above, the application could be, for example, a browser with the content 402 being content for a website accessed by the browser. In another example, the application may be an email application, and the content may be from email messages received by the user. In another example, the application can be a social media or news feed application, and the content 402 can be a stream of posts or news items according to the user's settings in that application. In short, any application can be providing any content 402 to the application window 401.

On the right, a panel 411 includes controls and output specifically for the capture application. This panel can also be a popup. In the panel, for example, a button 403 may be available to invoke the information capture features of the capture application as described herein. Another note button 404 may invoke interface elements that allow the user to create their own note based on the content 402 of the application window 401 or otherwise. When the capture button 403 is selected, the capture application will perform, for example, the method of FIG. 3 on the content 402 in the application window 401. There may be multiple application windows open on a desktop of the user device. The capture application may operate only on whatever application window has focus or may operate on all the open application windows of the desktop.

A "related" content panel 405 may display additional content that the capture application has identified that is related to the content 402 of the application window. For example, the capture application may use the information extracted from the content 402 as an internet search and may serve up to the user links to related content in the panel 405. The user can either select these links to see the related content and/or include the related content in a note or a prompt based on the content 402. A "recent" panel 406 may display for the user a list of recent notes created by the capture application for quick reference.

Figure 6:
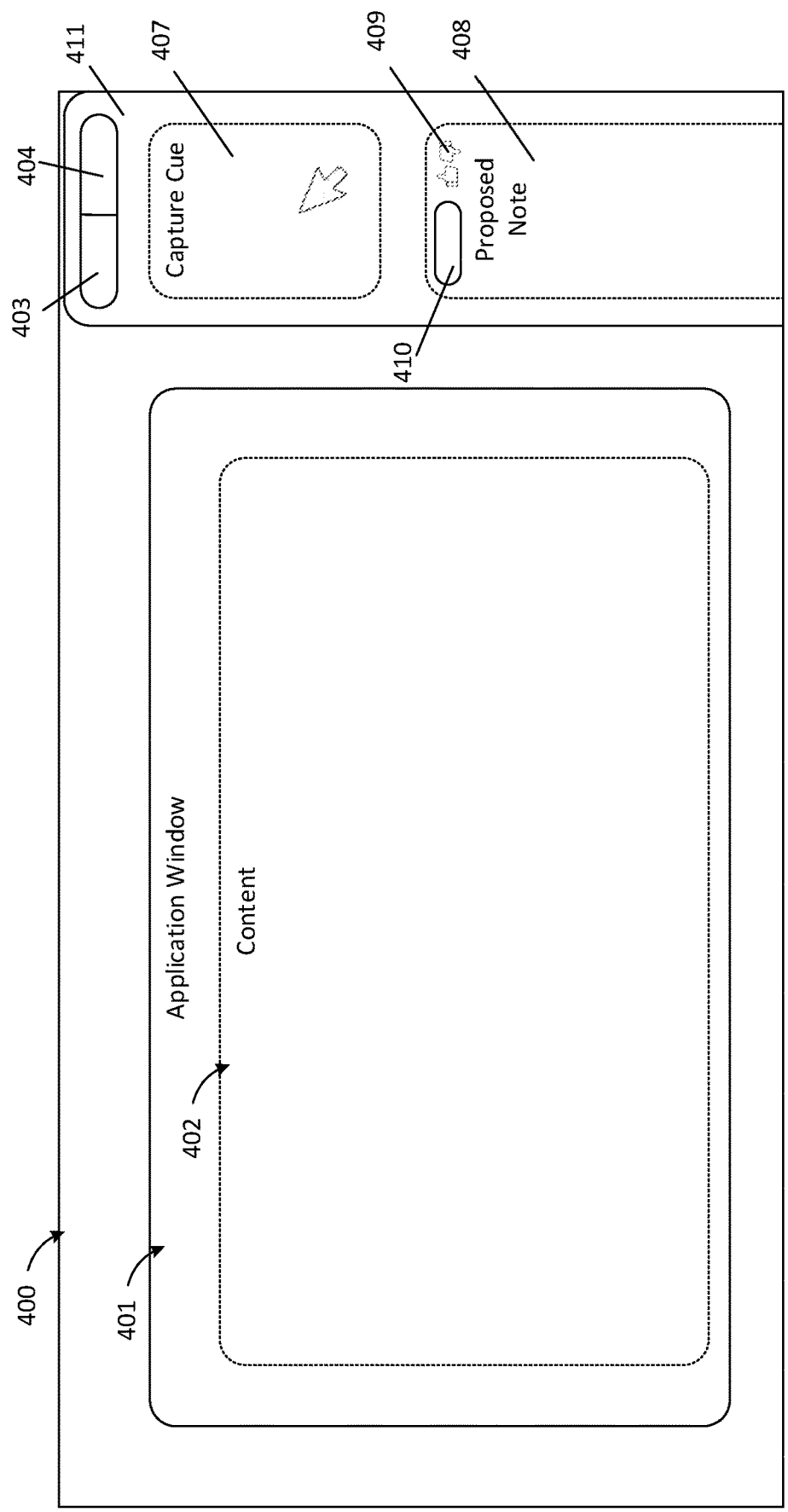
FIG. 6 depicts additional details of an example of a user interface according to principles described herein.

FIG. 6 depicts additional details of an example of a user interface according to principles described herein. As shown in FIG. 6, the capture application panel 411 can include an interface 407 for the user to input a capture cue to be included in the prompt to the AI model. For example, the user may specify in the capture cue interface 407 that a particular type of information is to be extracted from the content 402. For example, extract name and related contact information or extract appointment information. The capture cue interface 407 can also take instructions as to how the output is to be returned from the AI model, such as in a table, as a numbered list, bullet points, a paragraph or any other format that would best represent the information to the user. This can be determined by user input or later by a heuristic. Users could also have the choice to toggle between different representations of the capture.

A proposed note panel 408 allows the user interface 400 to display notes that have been generated by the AI model of user review. The system can also allow users to refine the information that has been returned. For example, the user may update the capture cue, e.g., clarify their intent in natural language of how and what they would like captured. For table results, the user feedback might not be limited to natural language. Rather, users can add column headers to be populated with data by the system. The system may also provide suggestions on how the content could be refined.

In the example of FIG. 6, a pair of buttons 409 may allow the user to quickly approve or disapprove of the proposed note. If the user selects the button to disapprove of the note, a prompt may appear in the capture cue interface 407 asking the user to input further instructions as to the desired output. This prompt may list one or more main aspects of the captured data amongst which the user can select the one of most interest on which the next iteration of the note should focus. Any such input is then included by the prompt generator in the next prompt to the AI model.

When a proposed note is approved, storage user interface element 410 shows where or how the note is to be stored in the user data structure. If the currently display option is not where the user wants the note to be stored, selecting the storage interface element 410 can display a user interface for selecting how or where to store the note. This may include dropdown or other menus of locations or formats in which the note can be added to the user data structure.

It is not required that refinement happen immediately after the original capture. A user may choose to simply use "one-click capture" and move on with their work. Later, when they come back, they may wish to refine the presented note. Along with storing the note, the system can store the image (not only for this process but also to allow the user to understand what the AI processed on) and any state that might be needed to refine the query in the future. This could include the processed information from the screen as well. The user is not required to return to the state they were in (i.e., open back up the content) to refine their note with the AI model. Note the user can change or modify the text of the note, as if it were a note they had manually created.

As will be appreciated, the capture application of the present description has endless uses and can solve technical problems of data capture and archiving in an endless variety of scenarios. Two exemplary use cases are as follows:

Anita (Consumer, Family—parent)—Trip planning+ Shopping (notes and lists)

Starting point: Edge/Chrome

Anita is planning a family trip to Thailand. She finds several travel and food recommendation webpages on Thailand. When she sees a webpage that is interesting, she presses "Remember This" in a notebook application. A screenshot of what she is working on is captured with an annotation of some key information. For some content, the captures are bullets while others, like flight options, are captured in a table. This keeping her moving in the limited time she has, not having to manually annotate the screen capture or manually writing out notes.

Ash (Business, large enterprise)—Personal meeting notes

Starting point: Teams/Zoom

Ash has a recurring sales meeting each week titled "Sales Update" where Anaya details rules and plans. There is a lot of information in a short time, and Ash will need it during the week.

Ash likes using "Remember This" because even when he is in an active discussion with Anaya, he grabs what is on the screen with confidence. The automatic notes of what was on the screen often gives him key information, which he finds useful to have pulled out for him automatically from the screen in case he needs to copy/paste it into a message or report later.

Figure 7:
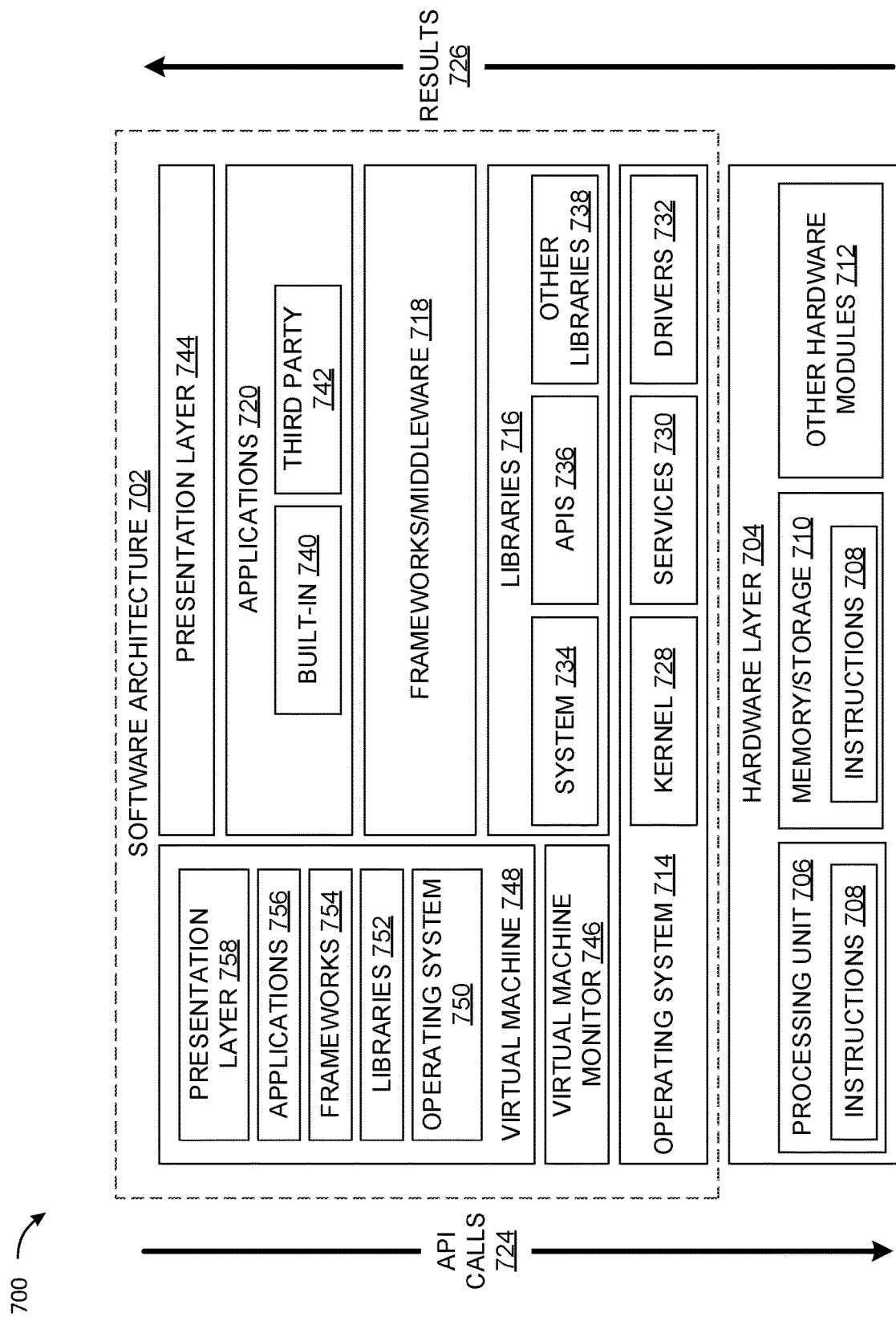
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
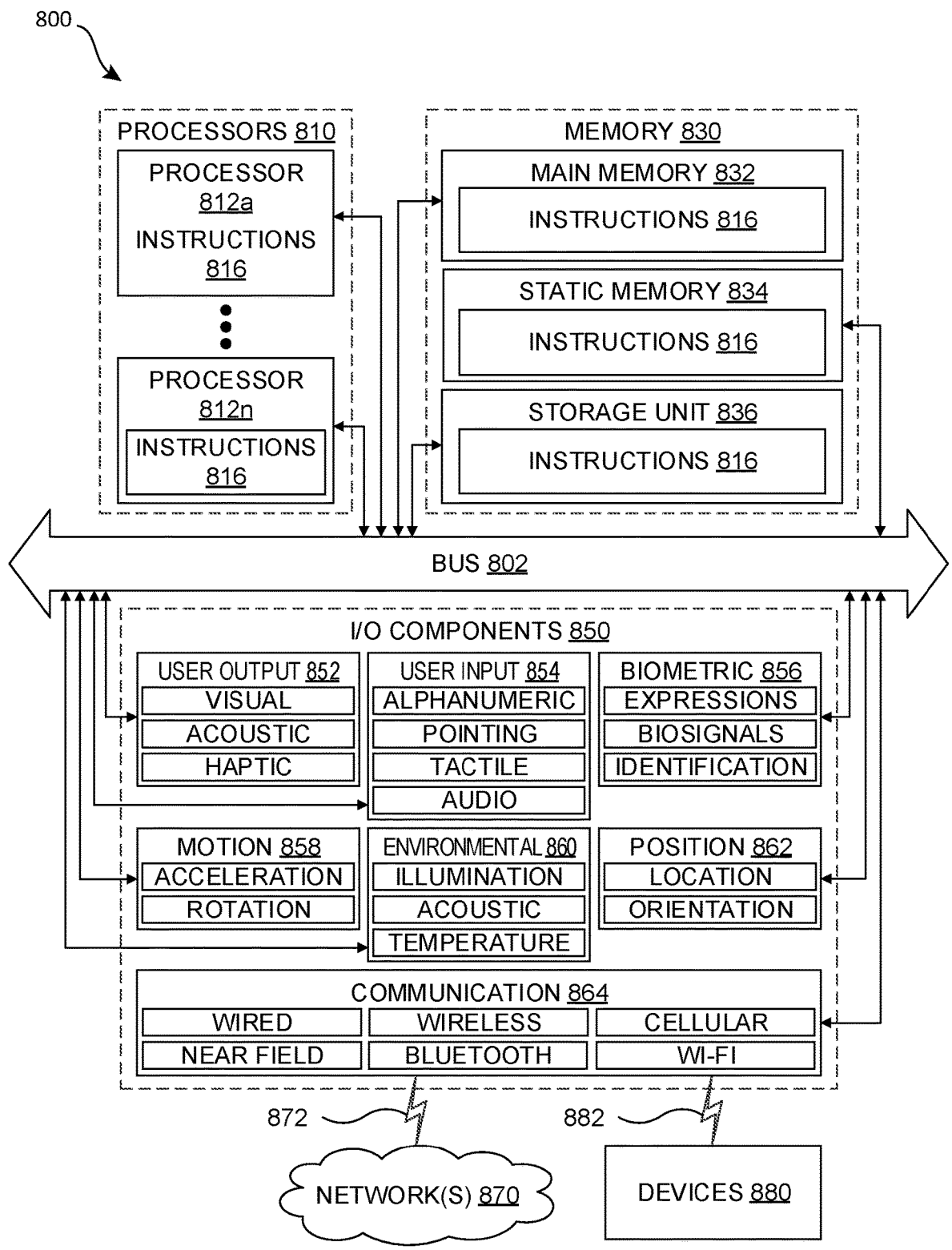
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed.

As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-6) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A device comprising:
 a display for presenting information to a user,
 a user interface for receiving user input from the user;
 a processor; and
 a memory storing executable instructions which, when executed by the processor, cause the processor, alone or in combination with other processors, to perform the following:
 capturing information on the display;
 operating a prompt generator to structure a prompt for a generative Artificial Intelligence (AI) model, the prompt based on the information captured from the display and causing the AI model to generate a note based on the information captured; and
 storing the note in a user data structure for future reference by the user.

Item 2. The device of Item 1, further comprising an Optical Character Recognition (OCR) service to recognize characters in the information captured from the display, the recognized characters being provided to the prompt generator.

Item 3. The device of Item 1, wherein the instructions, when executed, further perform:
 receiving the note from the AI model; and
 presenting the note to the user via the display.

Item 4. The device of Item 1, wherein the instructions, when executed, further perform:
 using the user interface, receiving user input in response to the note;
 operating the prompt generator to structure an updated prompt for the AI model based on the user input; and
 sending the updated prompt to the AI model to generate an updated note.

Item 5. The device of Item 4, wherein:
 the user input indicates what information the user desires to retain from the captured information; and
 the prompt generator is to structure the updated prompt for the AI model based on what information the user desires to retain.

Item 6. The device of Item 1, further comprising:
 a network interface for the processor; and
 a browser to retrieve information via the network interface based on user input for presentation on the display.

Item 7. The device of Item 1, further comprising:
 a network interface for the processor;
 wherein the user data structure is stored in cloud storage accessed via the network interface.

Item 8. The device of Item 1, wherein the user interface comprises:
a control for invoking the capture of information on the display; and
a capture cue input for receiving user input indicating what type of information the user wants to capture in the note.

Item 9. The device of Item 1, wherein the user interface comprises controls for receiving user input specifying how or where to add the note to the user data structure.

Item 10. The device of Item 1, wherein the user data structure is stored in cloud storage accessed via the network interface.

Item 11. The device of Item 1, wherein the instructions are incorporated into an operating system of the device or a productivity application.

Item 12. A method of generating archival notes for a user based on content a user has located electronically and viewed on a display device, the method comprising:
capturing information on the display device;
operating a prompt generator to structure a prompt for a generative Artificial Intelligence (AI) model, the prompt based on the information captured from the display device and causing the AI model to generate a note based on the information captured; and
storing the note in a user data structure for future reference by the user.

Item 13. The method of Item 12, further comprising:
capturing the information on the display device with a screen capture function; and
using an Optical Character Recognition (OCR) service to extract information from a screen capture for use in the prompt structured by the prompt generator.

Item 14. The method of Item 13, further comprising:
determining relative locations of content elements in the screen capture;
using the relative locations to determine what content from the screen capture to include in the prompt.

Item 15. The method of Item 12, further comprising:
receiving the note from the AI model; and
presenting the note to the user via the display.

Item 16. The method of Item 15, further comprising:
via a user interface with the display device, receiving user input in response to the note;
operating the prompt generator to structure an updated prompt for the AI model based on the user input; and
sending the updated prompt to the AI model to generate an updated note.

Item 17. The method of Item 12, further comprising:
with a user interface with the display device, receiving user input that indicates what information the user desires to retain from the captured information; and
structuring the prompt for the AI model based on what information the user desires to retain.

Item 18. A non-transitory computer-readable medium storing a capture application comprising instructions which, when executed by the processor, cause the processor, alone or in combination with other processors, to perform the following to generate archival notes for a user based on content a user has located electronically and viewed on a display device:
capture information on the display device;
operate a prompt generator to structure a prompt for a generative Artificial Intelligence (AI) model, the prompt based on the information captured from the display device and causing the AI model to generate a note based on the information captured; and
store the note in a user data structure for future reference by the user.

Item 19. The capture application of Item 18, further comprising instructions that, when executed, perform:
via a user interface located with the display device, receiving user input in response to the note;
operating the prompt generator to structure an updated prompt for the AI model based on the user input; and
sending the updated prompt to the AI model to generate an updated note.

Item 20. The capture application of Item 18, further comprising instructions that, when executed, perform:
with a user interface located with the display device, receiving user input that indicates what information the user desires to retain from the captured information; and
structuring the prompt for the AI model based on what information the user desires to retain.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
   a display for presenting information to a user;
   a user interface for receiving user input from the user;
   a processor; and
   a memory storing executable instructions which, when executed by the processor, cause the processor, alone or in combination with other processors, to perform:
      displaying information on the display;
      receiving the user input formatted in natural language, the user input including a request to capture the information on the display;
      capturing the information responsive to the request, wherein the information includes at least one of a screenshot, text, metadata, or a spatial relationship between content elements;
      operating a prompt generator to structure a prompt for a generative Artificial Intelligence (AI) model, wherein the prompt is based on the information captured from the display and the request and the prompt causes the generative AI model to generate a note based on the information and the request;
      storing the note and the information in a user data structure;
      receiving a second request from the user input to refine the note using the information;
      operating the prompt generator to structure an updated prompt for the generative AI model, wherein the updated prompt is based on the note and the information retrieved from the user data structure and the second request, and the updated prompt causes the generative AI model to generate a refined note based on the information and the second request;
      sending the updated prompt to the generative AI model to generate the refined note; and
      presenting the refined note to the user.

2. The device of claim 1, wherein the memory further stores executable instructions which, when executed by the processor, cause the processor, alone or in combination with other processors, to perform calling an Optical Character Recognition (OCR) service to process captured content from a screen capture from the display responsive to the request, the captured content including text and position information and provide the captured content to the prompt generator.

3. The device of claim 1, wherein:
   the second request includes an updated capture cue to clarify a user intent formatted in the natural language.

4. The device of claim 1, further comprising:
   a network interface for the processor; and
   a browser to retrieve the information via the network interface based on the user input for presentation on the display.

5. The device of claim 1, further comprising:
   a network interface for the processor;
   wherein the user data structure is stored in cloud storage accessed via the network interface.

6. The device of claim 1, wherein the user interface comprises:
   a control for invoking a capture of the information on the display; and
   a capture cue input for receiving the user input indicating a type of the information the user wants to capture in the note.

7. The device of claim 1, wherein the user interface comprises controls for receiving the user input specifying how or where to add the note to the user data structure.

8. A method of generating archival notes for a user based on content the user has located electronically and viewed on a display device, the method comprising:
   receiving a user input formatted in natural language, the user input including a request to capture information on the display device;
   capturing the information on the display device responsive to the request, wherein the information includes at least one of a screenshot, text, metadata, or a spatial relationship between content elements;
   operating a prompt generator to structure a prompt for a generative Artificial Intelligence (AI) model, the prompt being based on the information captured from the display device and the request, and causing the generative AI model to generate a note based on the information and the request;
   storing the note and the information in a user data structure;
   receiving a second request from the user input to refine the note using the information;
   operating the prompt generator to structure an updated prompt for the generative AI model, wherein the updated prompt is based on the note and the information retrieved from the user data structure and the second request, and the updated prompt causes the generative AI model to generate a refined note based on the information and the second request;
   sending the updated prompt to the generative AI model to generate the refined note; and
   presenting the refined note to the user.

9. The method of claim 8, further comprising:
   capturing the information on the display device with a screen capture function; and
   calling an Optical Character Recognition (OCR) service to process captured content from a screen capture from the display device responsive to the request, the captured content comprising text and position information and provide the captured content to the prompt generator.

10. The method of claim 9, further comprising:
determining relative locations of the content elements in the screen capture; and
using the relative locations to determine what content from the screen capture to include in the prompt.

11. The method of claim 8, wherein the second request includes an updated capture cue to clarify a user intent formatted in the natural language.

12. A non-transitory computer-readable medium storing a capture application comprising instructions which, when executed by a processor, cause the processor, alone or in combination with other processors, to:
receive a user input formatted in natural language, the user input including a request to capture information on a display device;
capture the information on the display device responsive to the request, wherein the information includes at least one of a screenshot, text, metadata, or a spatial relationship between content elements;
operate a prompt generator to structure a prompt for a generative Artificial Intelligence (AI) model, the prompt being based on the information captured from the display device and the request, and causing the generative AI model to generate a note based on the information and the request;
store the note and the information in a user data structure;
receive a second request from the user input to refine the note using the information;
operate the prompt generator to structure an updated prompt for the generative AI model, wherein the updated prompt is based on the note and the information retrieved from the user data structure and the second request, and the updated prompt causes the generative AI model to generate a refined note based on the information and the second request;
send the updated prompt to the generative AI model to generate the refined note; and
present the refined note to a user.

13. The non-transitory computer-readable medium storing the capture application of claim 12, wherein the second request includes an updated capture cue to clarify a user intent formatted in the natural language.

* * * * *